United States Patent Office 2,799,661
Patented July 16, 1957

2,799,661

MANUFACTURE OF MOLYBDENUM-CONTAINING CATALYSTS

Armand J. De Rosset, Clarendon Hills, Ill., assignor to Universal Oil Products Company, Des Plaines, Ill., a corporation of Delaware No Drawing. Application July 15, 1953,
Serial No. 368,201

9 Claims. (Cl. 252—465)

This invention relates to the manufacture of molybdenum-containing catalysts by a novel and improved method.

Molybdenum catalysts have found varied utility in the treatment and conversion of organic compounds and particularly of hydrocarbons. For example, catalysts comprising alumina and molybdenum oxide have been utilized commercially for the dehydrogenation of saturated hydrocarbons and particularly for the reforming of gasoline or gasoline fractions to improve the octane number thereof. Further, catalysts comprising alumina-molybdenum oxide-cobalt oxide are particularly useful for effecting desulfurization and other purification of hydrocarbon fractions and especially of gasoline fractions. Still further, these catalysts may be utilized for effecting dehydrogenation, hydrogenation, isomerization, etc. of organic compounds including alcohols, ketones, aldehydes, etc. and particularly of hydrocarbons.

Molybdenum-containing catalysts have been prepared by a number of different methods. A preferred method in the past has been to introduce the molybdenum in the form of ammonium molybdate and to subsequently convert the ammonium molybdate to molybdenum oxide. While this method produces satisfactory catalysts, it has the disadvantage of evolving vapors of ammonia during the handling and subsequent working of the ammonium molybdate, and the resultant atmosphere of ammonia is objectionable to the operators of the plant or to other persons in the vicinity thereof. The present invention avoids these and other disadvantages in the manufacture of molybdenum-containing catalysts.

An improved method of manufacturing molybdenum-containing catalysts comprises forming a mixture of molybdenum compound in oxalic acid and utilizing this mixture to impregnate a support. This method produces satisfactory catalysts. Still further improvements are obtained when the impregnating solution also contains a mineral acid in addition to the oxalic acid.

In one embodiment the present invention relates to a method of preparing a molybdenum-containing composite which comprises forming particles of a support, separately forming a mixture of a molybdenum compound, oxalic acid and a mineral acid, compositing said mixture with said support, and converting said molybdenum compound to molybdenum oxide.

In a specific embodiment the present invention relates to a method of preparing a catalyst comprising alumina, molybdenum oxide and cobalt oxide, which comprises forming alumina particles, heating the particles to effect at least partial drying thereof, separately forming an impregnating mixture of molybdic acid, cobalt nitrate, oxalic acid and nitric acid, compositing said impregnating mixture with said dried alumina particles, and heating the resultant composite to form a catalyst comprising alumina, molybdenum oxide and cobalt oxide.

In still another specific embodiment, a halogen is included in the composite hereinbefore set forth.

In still another specific embodiment, the composite prepared in the above manner may be sulfided to form a catalyst comprising alumina, molybdenum sulfide and cobalt sulfide, or alumina, combined halogen, molybdenum sulfide and cobalt sulfide.

It will be noted from the hereinbefore embodiments that an impregnating mixture comprising a molybdenum compound, oxalic acid and a mineral acid is formed, and the impregnating mixture is composited with preformed support particles. When utilizing the preferred supporting materials, there is a coaction between the molybdenum compound and/or other components of the catalyst and the support. However, it is understood that any suitable support or supporting material may be used in accordance with the present invention and may include supports having catalytic activity per se, supports which, in association with the molybdenum compound or other components of the catalyst, exert a catalytic effect over and above that of the molybdenum compound and other components, and supporting materials which serve merely as carriers for the active components of the catalyst and do not have catalytic activity per se.

Alumina is particularly preferred as the support because it appears to exert a peculiar influence with the other components of the catalyst. Other supports include compounds and particularly the oxides of zirconium, zinc, titanium, magnesium, thorium, etc. When a halogen is not utilized, or when a halogen which will not react with silica to form a volatile silicon-halogen compound is used, the support may comprise silica. For most catalysts, the support to be used is preferably synthetically prepared and in many cases purified. However, in other cases, naturally occurring supporting materials may be satisfactory and thus may comprise naturally occurring clays, diatomaceous earth, feldspar, bauxite, etc., which may be acid or otherwise treated as desired. In some cases the support may comprise a mixture of two or more of the oxides hereinbefore set forth as, for example, composites of the oxides of aluminum and boron, aluminum and titanium, aluminum and silicon, aluminum zirconium, aluminum, silicon and zirconium, aluminum and magnesium, aluminum, silicon and magnesium, zinc and zirconium, zinc and magnesium, etc. These multiple component supports may be synthetically prepared or naturally occurring as, for example, most naturally occurring clays contain a mixture of components. As hereinbefore set forth, the supports vary in their contribution to the total activity of the catalyst and therefore it is understood that the various supports which may be employed in accordance with the present invention are not necessarily equivalent.

Synthetically prepared alumina may be manufactured by the reaction of a suitable aluminum salt, such as a chloride of aluminum, a sulfate of aluminum, a nitrate of aluminum, an acetate of aluminum, etc. with a suitable alkaline reagent, such as ammonium hydroxide, ammonium carbonate, etc. to precipitate aluminum hydroxide. The aluminum hydroxide to which halogen may be added when desired, is formed into particles of uniform or irregular size and shape. Usually this entails washing the aluminum hydroxide, drying, forming into particles and calcining the particles. In another embodiment partial washing is effected and then partial drying, followed by further washing and further drying of the support. In still another embodiment, the aluminum hydroxide may be formed into substantially spherical shaped particles in any suitable manner and then washed and dried.

Supports comprising other oxides may be prepared in substantially the same manner as hereinbefore set forth in connection with the preparation of alumina, with the understanding that suitable modifications in the method of preparation will be made to suit the particular oxide desired. For example, silica gel may be prepared by the acidification of water glass or other suitable alkali metal silicate solutions, and the silica gel may be prepared either in substantially spherical shape by well known means or as wet cakes which are dried and formed into particles of uniform or irregular size and shape.

The wet cakes may be formed into particles of definite size and shape by first drying the wet hydroxide to remove a substantial proportion of the water therefrom and then forming into particles by suitable methods such as grinding, pelleting, extrusion, etc. Drying of the supporting material may be effected at any suitable temperature which generally will range from about 200° to 600° F. or more, and usually for a period of from about 2 to 24 hours or more. When the supporting material is to be calcined, it may be calcined at a temperature which generally will range from about 600° to 1400° F. or more, preferably at a temperature of from about 800° to 1200° F., and usually for a period of from about 1 to 12 hours or more. The drying and/or calcination may be effected in the presence of air, a reducing atmosphere such as hydrogen, an inert atmosphere such as nitrogen, or a mixture thereof. In still another embodiment the catalyst may be calcined in a reducing atmosphere and then calcined in an oxidizing atmosphere, or the reverse procedure may be utilized.

As hereinbefore set forth, in one embodiment the catalyst contains a halogen. In one embodiment the halogen may be added subsequently to the forming of the support into particles and either separately or in commingled state with the other components. Any suitable halogen may be employed and thus may comprise fluorine, chlorine, bromine and iodine. The exact state of the halogen in the catalyst has not been established, but the halogen is present in a combined state, probably in association with the support and/or other components of the catalyst. The halogen may be added in any suitable manner and, while the halogen may be utilized as such, it generally is preferred to use the same as an aqueous solution of a hydrogen halide for ease in handling. In another embodiment, when the halogen comprises fluorine, it may be added as an aqueous solution of an ammonium fluoride and particularly as an aqueous solution of ammonium bifluoride. Similarly, when the halogen comprises a halogen other than fluoride, it may be added as the ammonium halides thereof as, for example, ammonium chloride, ammonium bromide, etc. In still another embodiment, the halogen may be added as a metal halide salt when the salt is sufficiently soluble and the metal is desired in the final catalyst or is not objectionable therein.

In accordance with the present invention, the molybdenum is introduced into the catalyst by means of an impregnating solution containing the molybdenum compound, oxalic acid and a strong mineral acid. Oxalic acid, in combination with the strong mineral acid, appears to be unique in forming an impregnating solution which will readily dissolve the molybdenum compound and retain the same in solution, so that it may be successfully used in compositing with the other components of the catalyst. Furthermore, as will be hereinafter set forth, salts of other components as, for example, cobalt nitrate, may be composited with the impregnating solution and still not encounter precipitation of solids. This property of oxalic acid is unique and peculiar because of its specific complexing action with molybdic acid.

Any suitable strong mineral acid may be utilized in conjunction with the oxalic acid. The strong acid will have an ionization concentration of greater than about $1 \times 10^{-3}$. Nitric acid is particularly preferred because it will not leave an undesirable acid residue in the catalyst. Other acids include hydrochloric acid, hydroiodic acid, hydrobromic acid, hydrofluoric acid, phosphoric acid, sulphuric acid, etc. In another embodiment, a mixture of two or more mineral acids may be employed. In general the acid must meet three qualifications. In the first place it must be sufficiently strong in order to produce the desired results. It must not react excessively with the support and thereby destroy the physical and/or chemical properties of the support. With most catalysts, it generally is desired that the acid should not leave an acid residue which may prove to be objectionable in the final catalyst.

The concentrations of oxalic acid and mineral acid will be selected so that the molybdenum compound and, when employed, other metal compound or compounds, will be a homogeneous solution and will remain as a stable solution for sufficient time to permit ready impregnation of the solution with the support. The specific concentrations of the acids will depend upon the particular normality of the acid solutions. The proportions of oxalic acid and mineral acid may be varied and may range, for example, from about 1 volume to 20 volumes or more of one acid to 1 volume of the other acid on an anhydrous basis. It is understood that the water to be supplied to the system may be introduced, all or in part, with the various components and generally will be introduced as the water used in forming solutions of the various components for ease in handling. Any additional water which may be required may be introduced into the system at any step of the preparation.

In a preferred embodiment, the concentrations of acids will be selected so that the mixture of acids and metal compound or compounds will have a pH of below about 1 and still more preferably below about 0.7. It is understood that, in forming the impregnating solution, one or both of the acids may be introduced at one time or in increment portions.

Any suitable molybdic acid may be used, including those available commercially which contain a small amount of ammonia, probably in chemical combination with the molybdic acid. While molybdic acid is a preferred source of molybdenum, it is understood that any other suitable source of molybdenum may be employed. For example, molybdenum oxides and particularly molybdenum trioxide may be utilized.

A particularly preferred catalyst comprises alumina, molybdenum oxide and cobalt oxide. Other catalysts include a support, molybdenum oxide and an oxide of nickel and/or iron. Still other catalysts comprises a support, molybdenum oxide and an oxide of titanium, zirconium, cerium, hafnium, thorium, vanadium, niobium, tantalum, chromium, tungsten, uranium, manganese, magnesium, platinum, palladium, ruthenium, rhodium, osmium, iridium, etc., and mixtures thereof. In preparing the catalyst any suitable soluble salt of the metal may be employed. A particularly preferred salt of cobalt comprises cobalt nitrate. Other soluble salts of cobalt include cobalt ammonium nitrate, cobalt ammonium chloride, cobalt ammonium sulfate, cobalt bromate, cobalt bromide, cobalt chloride, cobalt chlorate, cobalt fluosilicate, cobalt iodide, cobalt potassium sulfate, etc. Soluble salts of nickel include nickel ammonium nitrate, nickel ammonium sulfate, nickel bromide, nickel chloride, nickel fluosilicate, nickel iodide, nickel nitrate, nickel sulfate, etc. Soluble iron salts include iron ammonium sulfate, ferric bromide, ferrous bromide, ferric chloride, ferrous chloride, ferric nitrate, ferrous nitrate, etc. It is understood that these various salts are not necessarily equivalent.

The impregnating mixture may be prepared in any suitable manner. In one method a mixture of oxalic acid and mineral acid in the desired proportions is made and then the molybdenum compound dissolved therein, followed by the addition of other metal compound or compounds when employed. In another method, all or a portion of the molybdic acid may be dissolved in one acid and then the other acid is added, preferably in increment proportions and either before or after all of the molybdic acid has been introduced. When employed the other metal compound or compounds may be introduced into the mixture, preferably in increment proportions, and then additional acid introduced during or after the addition of the other metal compound or compounds. In still another embodiment the molybdic acid is added to the mixture after the other metal compound or compounds have been dissolved in the acid or acids. It is understood that any suitable method of forming the homogeneous mixture may be employed and, in the event that difficulty is encountered in obtaining a homogeneous solution, the mixture may be heated, which generally will not require temperatures in excess of about 200° F.

The proportions of acids to molybdenum compound and, when employed, other metal compound or compounds, will be selected so that the mixture will be a homogeneous solution. The concentration of molybdic compound and other metal compounds will be selected so that the final composite contains those components in the desired proportions and may vary from 1 part of one component to 20 parts or more of the other components. In a preferred catalyst comprising a support, molybdenum oxide and cobalt oxide, the support comprises a major proportion of the catalyst and the molybdenum oxide (calculated as Mo) and the cobalt oxide (calculated as Co) each may comprise from about 1 to about 25% by weight of the final composite. The atomic proportions of molybdenum (Mo) to cobalt (Co) may be equal or may range up to 20 or more atomic proportions of one component to one atomic portion of the other. A particularly preferred catalyst comprises alumina, molybdenum oxide and cobalt oxide and in this catalyst the alumina comprises a major proportion of the composite and may range from about 50% to about 90% by weight of the final catalyst, the molybdenum being present in a concentration of from about 5% to about 10% by weight, and the cobalt being present in a concentration of from about 0.5% to about 5% by weight. In still another embodiment the composite contains combined halogen and halogen may be present in a concentration from about 0.01% to about 20% or more by weight of the final catalyst and preferably is present in a concentration of from about 1% to about 10% by weight. It is understood that the various halogens are not necessarily equivalent and that the concentrations thereof will depend upon the particular halogen employed. It is also understood that a mixture of two or more halogens may be utilized and particularly a mixture of fluorine and chlorine.

The impregnating solution as prepared in the above manner may be composited with the support in any suitable manner. As hereinbefore set forth the support is prepared as preformed particles which are dried and/or calcined prior to compositing with the impregnation solution. In one embodiment, preformed particles of the support are dipped, soaked, immersed, suspended, etc., in the impregnation solution, excess solution is drained or otherwise removed from the particles, and the oxides developed by heating, preferably in the presence of air. Preferably the excess solution is reused in the interest of economy, and it may be reused as such or commingled with fresh solution and utilized for further impregnation of preformed support particles. It is understood that any suitable method of compositing the impregnating solution with the preformed particles of the support may be employed and that the mixing and working of these preparations may be effected at ambient or elevated temperatures, which temperature generally will not be above about 200° F.

In another preferred embodiment, the catalyst comprises a support and particularly alumina, molybdenum sulfide and cobalt sulfide and such a composite also containing halogen. This catalyst is readily obtained by sulfiding the composite containing the oxides. The sulfiding may be accomplished in any suitable manner. In one method the sulfiding may be effected by passing hydrogen sulfide through the composite, preferably at an elevated temperature, which may range from about 500° to about 1000° F. or more for a time sufficient to effect substantially complete sulfidation, which can be determined by continuing the treatment until there is no further absorption of hydrogen sulfide. In another embodiment, the composite containing the oxides may be utilized at an elevated temperature for the treatment of a hydrocarbon or other fraction, particularly a gasoline fraction, containing sulfur compounds, and thereby convert the oxides to the sulfides in situ.

The catalysts of the present invention are particularly suitable for the treatment of organic compounds and especially of hydrocarbons. Still more particularly these catalysts are of advantage for use in the treatment of gasoline or gasoline fractions containing undesirable impurities. The treatment of gasoline or gasoline fractions generally is effected in the presence of hydrogen at temperatures of from about 500° to about 800° F., although in some cases higher temperatures up to 850–900° F. may be employed. Atmospheric and preferably superatmospheric pressures ranging from 50 to 5000 pounds per square inch or more may be utilized. This treatment will serve to remove impurities comprising sulfur, nitrogen, oxygen and arsenic from the gasoline or gasoline fraction and thereby is particularly suitable for treatment of gasoline or gasoline fractions prior to reforming of the gasoline in contact with a reforming catalyst containing a noble or expensive metal, in order to avoid the deleterious effects of these impurities on the reforming catalyst. Similarly, the catalyst of the present invention may be used for the treatment of other hydrocarbon fractions in order to remove undesirable impurities as, for example, the treatment of aromatic solvents, kerosene, gas oil, fuel oil, etc.

The catalyst of the present invention also may find utility for other conversion reactions of organic compounds and particularly hydrocarbons, including reforming of gasoline, dehydrogenation of normally gaseous or normally liquid hydrocarbons, isomerization of organic hydrocarbons, destructive hydrogenation of hydrocarbons to lower molecular weight compounds, non-destructive hydrogenation of unsaturated hydrocarbons, hydrogen transfer reactions, alkyl transfer reactions, polymerization reactions, etc. Dehydrogenation and reforming reaction generally are effected at temperatures of from about 800° to 1200° F. or more, while nondestructive hydrogenation reactions generally are effected at temperatures of from about 300° to about 800° F. The various reactions hereinbefore set forth may be effected in the presence of hydrogen when required or of advantage.

The following examples are introduced to illustrate further the novelty and utility of the present invention, but not with the intention of unduly limiting the same.

*Example I*

A catalyst is prepared to contain approximately 90 percent by weight of alumina, 8.6 percent of molybdenum oxide and 1.4 percent by weight of cobalt oxide. This catalyst is prepared as follows:

140 grams of oxalic acid dihydrate is dissolved in 800 ml. of water at 115° F. A total of 345 grams of molybdic acid (commercial CP, 85% $MoO_3$) is added in increment portions with stirring and intermittent addition of concentrated nitric acid to a total of 110 ml. This served to bring the pH of the solution to below 1. 200 grams of cobalt nitrate hexahydrate was added. The mixture is a homogeneous solution and remains stable for considerable time, so that it could be used to impregnate at least five different batches of preformed support particles.

Alumina pills were prepared by commingling ammonium hydroxide with a chloride of aluminum to form aluminum hydroxide. During the final washing and filtering of the aluminum hydroxide, sufficient hydrogen fluoride solution was added to form a final catalyst containing about 0.3% by weight of fluorine. The aluminum hydroxide combined fluorine composite was dried, formed into cylindrical pills, and calcined at a temperature of about 1200° F.

500 grams of alumina pills are impregnated with a total of 250 ml. of impregnating solution in a series of five batches. The impregnated alumina particles then are dried, calcined for two hours in perfluent air at 770° F., and finally sulfided at 770° F. in perfluent hydrogen sulfide.

As hereinbefore set forth, the impregnating solution remains liquid without precipitation of solids and may be used for at least five dippings of alumina pills. The cobalt nitrate was readily dissolved in the solution. The alumina pills were uniformly impregnated, and the catalyst therefore is of improved activity and stability for use in conversion reactions.

Example II

It was found that molybdic acid would not dissolve in nitric acid to form a suitable impregnating solution. The use of both oxalic acid and nitric acid is necessary in order to prepare an improved impregnating solution.

Example III

In a preparation similar to that described in Example I but utilizing only oxalic acid and not nitric acid, it was found that the impregnated pills tended to have a lighter color in the center. While these catalysts are usually satisfactory, still further improved catalyst are obtained when the impregnation is uniformly distributed on and throughout the spheres, with the result that the spheres are homogeneous throughout.

Example IV

A catalyst was prepared in substantially the same manner as described in Example I. However, in this preparation, the catalyst contained about 2% by weight of combined fluorine. The fluorine was introduced as hydrogen fluoride which served as a component of the impregnating solution. The impregnating solution comprised 10 grams oxalic acid, 35 ml. water, 2.5 ml. concentrated nitric acid, 4 ml. 50% hydrofluoric acid, 12 grams molybdic acid (85% $MoO_3$) and 7.3 grams cobalt nitrate hexahydrate. The impregnation solution remained homogeneous and 52 ml. thereof were used to impregnate 100 grams of calcined alumina pills. The catalyst was uniformly impregnated and was of constant color throughout.

Example V

A catalyst prepared in the manner described in Example IV was utilized for the purification of a thermally cracked naphtha having an API gravity at 60° F. of 48.0, a boiling range of from 215° to 401° F., a sulfur content of 1.27% by weight, a bromine number of 75 and a basic nitrogen content of 0.0173% by weight. The purification treatment was effected at a temperature of about 700° F., a pressure of 800 p. s. i., a liquid hourly space velocity of about 10, and hydrogen in an amount of about 2,000 cubic feet per barrel of naphtha.

By treatment in the above manner the sulfur content of the naphtha was reduced 91%, the bromine number 88% and nitrogen 75%. It will be noted that this catalyst was very effective in reducing the impurities of the naphtha.

Example VI

The catalyst as prepared in the above manner may be utilized for the purification of a heavy catalytic cycle oil obtained in the cracking of a Mid-Continent gas oil. This heavy cycle oil may have an API gravity at 60° F. of about 25, a bromine number of about 19, a sulfur content of about 0.5% by weight, and a boiling range of from about 450 to above 750° F. The purification may be effected at a temperature of about 780° F. and a pressure of 600 p. s. i., in the presence of hydrogen in an amount of about 1500 cubic feet per barrel of oil. This treatment will serve to considerably reduce the sulfur and nitrogen content, as well as to reduce the bromine number of the cycle oil.

Example VII

A catalyst prepared in substantially the same manner may be utilized for the desulfurization and hydrogenation of an aromatic solvent containing sulfur and olefinic compounds in small and undesired amounts. This treatment may be effected at a temperature of 900° F., a pressure of 500 p. s. i. and in the presence of hydrogen in an amount of 500 cubic feet per barrel of aromatic solvent. This treatment will serve to reduce the sulfur and olefinic content of the aromatic solvent and thereby permit it to pass commercial specifications.

Example VIII

A catalyst may be prepared to comprise alumina, 3% by weight of fluorine (calculated as F, 8% by weight of molybdenum sulfide (calculated as Mo) and 3% by weight of nickel sulfide (calculated as Ni). This catalyst is prepared through the use of oxalic acid and mineral acid in substantially the same manner as hereinbefore set forth but is treated with hydrogen sulfide prior to use. The catalyst may be utilized for the purification of a Mid-Continent straight run naphtha containing sulfur compounds, nitrogen compounds, oxygen compounds and arsenic compounds. The treatment may be effected at a temperature of 750° F. and a pressure of 800 p. s. i. and in the presence of hydrogen in an amount of 1,000 cubic feet per barrel of naphtha. This treatment will serve to effectively reduce these impurities and thereby will provide a treated naphtha which may be subjected to reforming in the presence of a catalyst comprising alumina, combined halogen and platinum, at a temperature of 930° F. and a pressure of 700 p. s. i.

Example IX

A catalyst comprising zirconia, 8% by weight of molybdenum oxide (calculated as Mo) and 8% by weight of cobalt oxide (calculated as Co) may be prepared by precipitating zirconia from zirconium sulfate by commingling ammonium hydroxide therewith. The zirconia is washed to remove soluble impurities, dried at 300° F. for 10 hours, formed into particles of irregular size and shape, and calcined at 1100° F. for 4 hours. An impregnating solution is formed by dissolving the molybdic acid and cobalt fluoride in oxalic acid and hydrofluoric acid. The impregnating solution is composited with the zirconia particles and then dried at 250° F. for 14 hours, calcined in air at 900° F. for 8 hours.

The catalyst may be utilized for the reforming of straight run naphtha at a temperature of 950° F. and a pressure of 800 p. s. i. in the presence of hydrogen in a ratio of 8 mols of hydrogen to 1 mol of hydrocarbon.

I claim as my invention:

1. In the manufacture of molybdenum-containing catalyst, the step which comprises impregnating preformed, dry, solid particles of an inorganic inert supporting material with a molybdenum compound-oxalic acid solution containing a strong mineral acid having an ionization concentration greater than about $1 \times 10^3$ in a sufficient amount to impart to the solution a pH below about 1.

2. In the manufacture of molybdenum-containing alumina catalyst, the step which comprises impregnating shaped and calcined particles of alumina with a molybdenum compound-oxalic acid solution containing a strong mineral acid having an ionization concentration greater than about $1 \times 10^3$ in a sufficient amount to impart to the solution a pH below about 1.

3. In the manufacture of molybdenum-containing catalyst, the step which comprises impregnating preformed, dry, solid particles of an inorganic inert supporting material with a molybdenum compound-oxalic acid solution containing sufficient nitric acid to impart to the solution a pH below about 1.

4. In the manufacture of molybdenum-containing alumina catalyst, the step which comprises impregnating shaped and calcined particles of alumina with a molybdenum compound-oxalic acid solution containing sufficient nitric acid to impart to the solution a pH below about 1.

5. The step of claim 1 further characterized in that said mineral acid is hydrofluoric acid.

6. The step of claim 1 further characterized in that said mineral acid is hydrochloric acid.

7. The step of claim 1 further characterized in that said mineral acid is phosphoric acid.

8. The step of claim 4 further characterized in that said solution contains a compound of a metal selected from the group consisting of cobalt, nickel and iron.

9. The step of claim 4 further characterized in that said solution contains cobalt nitrate.

References Cited in the file of this patent

UNITED STATES PATENTS

| | | |
|---|---|---|
| 2,289,784 | Houghton | July 14, 1942 |
| 2,322,622 | Fischer et al. | June 22, 1943 |
| 2,369,734 | Heard | Feb. 20, 1945 |
| 2,651,617 | Schmerling | Sept. 8, 1953 |